(12) United States Patent
Bigioi et al.

(10) Patent No.: US 9,354,486 B2
(45) Date of Patent: May 31, 2016

(54) MEMS FAST FOCUS CAMERA MODULE

(71) Applicant: DigitalOptics Corporation MEMS, Arcadia, CA (US)

(72) Inventors: Petronel Bigioi, Galway (IE); Peter Corcoran, Claregalway (IE); Takanori Miki, San Jose, CA (US)

(73) Assignee: DIGITALOPTICS CORPORATION MEMS, Arcadia, CA (US)

( * ) Notice: Subject to any disclaimer, the term of this patent is extended or adjusted under 35 U.S.C. 154(b) by 172 days.

(21) Appl. No.: 13/913,356

(22) Filed: Jun. 7, 2013

(65) Prior Publication Data

US 2013/0329106 A1   Dec. 12, 2013

Related U.S. Application Data

(60) Provisional application No. 61/657,012, filed on Jun. 7, 2012.

(51) Int. Cl.
  *H04N 5/232*   (2006.01)
  *H04N 5/335*   (2011.01)
  *G03B 3/10*    (2006.01)
  *H04N 5/225*   (2006.01)

(52) U.S. Cl.
  CPC ............... *G03B 3/10* (2013.01); *H04N 5/2257* (2013.01); *H04N 5/23212* (2013.01); *H04N 5/23219* (2013.01)

(58) Field of Classification Search
  CPC ... G03B 3/10; H04N 5/2257; H04N 5/23212; H04N 5/23219

USPC ................... 348/308, 345–354, 356
See application file for complete search history.

(56) References Cited

U.S. PATENT DOCUMENTS

| | | | |
|---|---|---|---|
| 8,164,681 B2* | 4/2012 | Matsuno et al. | 348/345 |
| 8,717,486 B2* | 5/2014 | Kosaka | G02B 7/02 257/700 |
| 2006/0012702 A1* | 1/2006 | Kawahara | H04N 5/23293 348/345 |
| 2006/0082899 A1* | 4/2006 | Kogo | 359/687 |
| 2008/0044172 A1* | 2/2008 | Tang | G02B 13/009 396/89 |
| 2008/0069553 A1* | 3/2008 | Li | G02B 7/36 396/125 |
| 2009/0268048 A1* | 10/2009 | Matsuno | G03B 7/28 348/222.1 |

\* cited by examiner

*Primary Examiner* — Trung Diep
(74) *Attorney, Agent, or Firm* — Haynes and Boone, LLP

(57) ABSTRACT

An auto focus camera module includes a camera module housing defining an aperture and an internal cavity to accommodate camera module components, an image sensor coupled to or within the housing, a lens barrel within the housing that contains an optical train including at least one movable lens disposed relative to the aperture and image sensor to focus images of scenes onto the image sensor along an optical path, and a fast focus MEMS actuator coupled to one or more lenses of the optical train including the at least one movable lens and configured to rapidly move said at least one movable lens relative to the image sensor to provide autofocus for the camera module in each frame of a preview or video sequence or both.

18 Claims, 12 Drawing Sheets

MEMS FAST FOCUS CAMERA MODULE

PRIORITY

This application claims the benefit of priority under 35 USC §119 to U.S. provisional patent application No. 61/657,012, filed Jun. 7, 2012; which is incorporated by reference. This application is also filed as PCT/US13/44844, on Jun. 7, 2013.

FIELD OF THE INVENTION

The invention relates to auto focus camera modules, and particularly utilizing a MEMS actuator to move one or more movable lenses of an optical train to rapidly change camera focus distance.

BRIEF DESCRIPTIONS OF THE DRAWINGS

FIG. 1 schematically illustrates a cross sectional view of an example of an auto focus camera module including a subset of movable lenses and a MEMS actuator in accordance with certain embodiments.

FIG. 2 schematically illustrates another example of an auto focus camera module including a different subset of one or more movable lenses and a MEMS actuator in accordance with certain embodiments.

FIG. 3A schematically illustrates a cross sectional view of an example of an auto focus camera module including a wire bond image sensor configuration in accordance with certain embodiments.

FIG. 3B schematically illustrates a cross section view of an example of an auto focus camera module including a flip-chip image sensor configuration in accordance with certain embodiments.

FIGS. 4A-4B schematically illustrate cross-sectional and top views of an image sensor that is disposed in a recess within a substrate in accordance with certain embodiments.

DETAILED DESCRIPTIONS OF THE EMBODIMENTS

Figure 1:
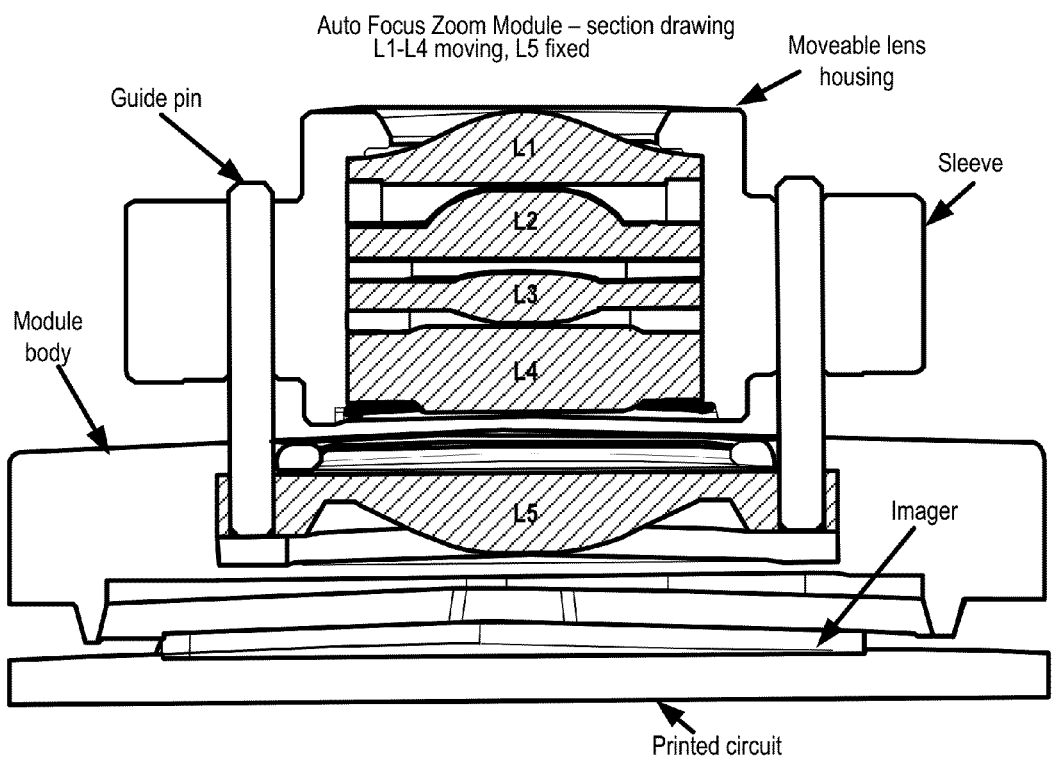

A camera in accordance with embodiments described herein includes an image sensor, which converts an image in an optical domain to an electronic format, and an optical train that focuses the scene of interest onto the image sensor.

Embodiments include cameras configured with an enhanced ability to accurately capture detail in a scene. The quality of the optical train and/or the resolution of the image sensor may be selected in accordance with a desired ability to accurately capture such detail. The image sensor may contain millions of pixels (picture elements) and the optical train may include two, three, four, five or more lenses.

The position of at least one movable lens of the optical train is not fixed relative to the position of the image sensor, and thus, cameras in accordance with embodiments described herein can alter the distance from the electronic camera at which objects will be in focus on the image sensor. A system may be utilized in accordance with embodiments to determine one or more distances of one or more principal objects in a scene from the camera. The at least one movable lens is movable in accordance with the determined distance and/or until one or more principle objects are in focus on the image sensor. These objects can range from being very close (10 cm or closer) to very distant (infinity) from the camera.

Embodiments are provided herein of cameras that provide image quality that is better than conventional autofocus and fixed focus cameras. Cameras in accordance with certain embodiments also exhibit miniature size, as well as advantageous power efficiency.

Electronic cameras in accordance with certain embodiments exhibit an advantageous capability to alter the field of view significantly. For example, a photograph of a family taken in front of their house might inadvertently include a refuse container at the edge of the scene when a conventional camera is being used. A camera in accordance with certain embodiments can be adjusted to restrict the field of view of the camera to eliminate this artefact from the captured image. Conversely, a photograph of a family taken on top of a hill can be enhanced using a camera in accordance with certain embodiments by adjusting to a wider field of view that captures more of the panorama.

Cameras in accordance with certain embodiments exhibit clear improvements in overall performance by incorporating dynamic field of view feature with an auto focus mechanism. In certain embodiments, the design of the optical train of the camera includes a part that is fixed and a part that is movable along the optical axis of the camera by an actuator. In certain embodiments, some image processing is provided by code embedded within a fixed or removable storage device on the camera and/or using a remote processor, e.g., removal of image distortion.

Advantageous cameras are provided in accordance with certain embodiments that integrate all three of these in a compact camera module. Such camera module may be a stand alone camera product, or may be included in a fixed or portable electronics product, and/or in various other environments such as automobiles.

Several embodiments will now be described with reference to the figures. Electronic cameras are provided herein that advantageously incorporate integrated auto focus and optionally zoom functionality. In certain embodiments, the autofocus and zoom functions utilize a combination of an advantageous optical train and processor-based image processing, and in certain embodiments include the same or similar components in both cases.

Alternative approaches to add auto focus may involve moving one or more other lenses in the optical train as a group. An auto focus zoom camera based on this principal of operation is described in U.S. Patent application Ser. No. 61/609,293 which is incorporated by reference. This movable lens group may contain more than one movable lens, and may contain four lenses as described in the '293 application, as well as various numbers of stops and apertures depending on the particular number and geometry of the lens or lenses forming the movable lens group.

An optical train in accordance with certain embodiments that includes auto focus, and optionally also zoom, includes two general components. FIG. 1 illustrates an auto focus zoom camera module including a first movable group L1-L4 in the example of FIG. 1, including one or more lenses that can be moved along the optical axis of the camera, and a fixed lens group, L5 in the example of FIG. 1, that includes at least one lens that is fixed in position. The moving lens is the lenses in the example of FIG. 1 are closest to the scene and a fixed lens is closest to the image sensor.

In general terms, the moving lens group performs the function of altering the focal distance of the camera, and in embodiments of camera modules that also include zoom, at least one fixed lens is configured to perform the optional electronic zoom function of matching the PSF function of the optic to the imager and compensating for the field curvature induced by the moving lens group. The fixed lens that may perform this function in specific embodiments described in the '293 application is the lens closest to the image sensor. At least one moving lens is located at an appropriate distance along the optical axis to achieve the desired focus distance, while at least one fixed lens is located such that its back focal length matches the distance between the lens and the imager.

A processor programmed by embedded code collects information from pixels in the image sensor and makes changes to the associated electronic file, in some cases automatically and in others based on user inputs. For example, the degree of zoom is adjustable. The processor endeavors to correct for distortion and other artefacts that are produced in a predictable manner by the optical train. The image processing features can be implemented in either hardware or software. In certain embodiments, these features are placed early in the image processing pipeline, such as RTL (resistor transistor logic) code embedded in the image sensor, while in others they are placed on an external DSP (digital signal processor) or entirely in software in a processor, such as the base band chip in a mobile phone.

An auto focus zoom camera example in accordance with the example illustrated at FIG. 1 has a focus distance that can range 10 cm to 9 m, is typically 15 cm to 5 m and is preferably 20 cm to 3 m (excluding the hyper-focal distance), while the zoom function can range x0.5-x5, is typically x1-x4 and is preferably x1-x3. A noteworthy characteristic of the final electronic file produced by an advantageous camera in accordance with certain embodiments is that file size and effective resolution of the image contained within it may be largely constant in certain embodiments irrespective of the focus distance and zoom setting.

In another embodiment, an auto focus camera may have an entire optical train that is moved in an auto focus process. In addition, advantageous cameras in accordance with embodiments described herein that include optical trains with both a movable component and a fixed component may be configured in accordance with many other examples than the two illustrated at FIG. 1 and FIG. 2. These advantageous auto focus zoom cameras have one or more parts of the optical train fixed and one or more parts moving. In certain embodiments, cameras exhibit exactitude of centering and tilt alignment of the moving lens to the fixed lens that differs from conventional fixed or auto focus cameras.

Figure 2:
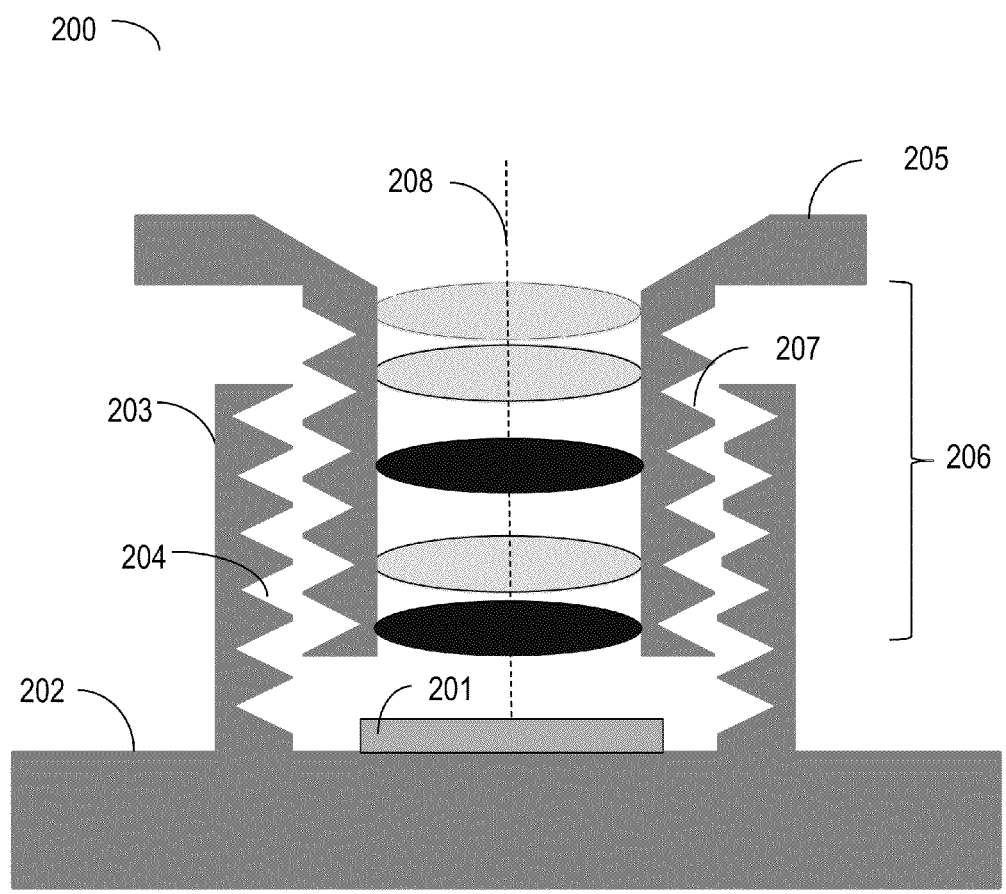

FIG. 2 illustrates another example of an auto focus camera module wherein the middle lens L3 is movable between two pairs of fixed lenses L1-L2 and L4-L5. This embodiment is described at U.S. patent application Ser. No. 61/643,331, which is incorporated by reference. The embodiments wherein only a single lens is included in the movable lens group, such as the middle lens L3 being movable relative to two pairs of fixed lenses L1-L2 and L4-L5 located on either side of the middle lens L3 have an advantage of small mass and thus a relatively low force is involved in moving it, and even has a surprising further advantage that a small displacement range actuator may be used. By moving the middle lens in the optical train in certain embodiments, e.g., L3 in an optical train including five lenses or L4 in an optical train of seven lenses or L2 in a train of three lenses. In other embodiments, the movable lens is offset from the middle somewhere between at least one fixed lens and the rest of the optical train, e.g., L2 or L4 in the five lens embodiment or L2, L3, L5 or L6 in the seven lens embodiment. Still other embodiments involve movable lenses at one or both ends of the optical train.

Contrary to perceived expectation, it transpires that to achieve a similar focus range to a conventional auto focus camera, the middle lens in the example of FIG. 2 is moved a relatively short distance, typically around 100 um. This makes possible the use of novel forms of actuator, such as MEMS, to move the lens and a number of consequential benefits arising from the inherent characteristics of such devices. Of the many benefits of this design, small size, low power consumption, low noise, high speed and high accuracy of movement and other improvements are provided.

MEMS Actuator

A MEMS actuator is coupled to L3 in the example of FIG. 2 (and to the movable lens group L1-l4 in the example of FIG. 1) to provide auto focus capability in certain embodiments. In other embodiments, a voice coil motor (VCM) or a piezo actuator may be used to provide movement capability.

Suitable MEMS actuators are described in several of the US Patents and US patent applications incorporated by reference herein below, e.g., see U.S. patent application Ser. No. 61/622,480. Another MEMS actuator having a somewhat different design is described in US-PCT application no. PCT/US12/24018. Both of these US patent applications are incorporated by reference, and other examples of MEMS actuators and components thereof are cited and incorporated by reference below as providing alternative embodiments. Such actuators can be fabricated in silicon or substantially polymeric materials and have a stroke of around 100 um. They also exhibit a number of other beneficial characteristics, which are conferred on an auto focus zoom camera module of the type described. These include, very low power consumption, fast and precise actuation, low noise, negligible particulate contamination and low cost.

A MEMS actuator in accordance with certain embodiments may be thought of as generally a unidirectional device, setting aside for the moment any centering or tilt alignment movements that may be ascribed to an actuator component.

That is, a MEMS actuator in accordance with certain embodiments has a rest position and the actuator can be driven from that rest position in one dimension only. This has a benefit for the assembly of auto focus camera modules in that it permits the entire lens train, or a substantial portion thereof, to be assembled as a pre-aligned unitary component. For subsequent assembly and calibration steps, it can then be handled similarly to or in exactly the same manner as the lens train of a fixed focus camera, namely the focus can be set by inserting a holder, containing the lens train into a sleeve fixed over the image sensor. In certain embodiments, the holder and sleeve are coupled by a screw thread.

FIG. 2 also schematically illustrates a cross-section through an auto focus zoom camera in accordance with certain embodiments that utilizes assembly with the lens train fabricated as a pre-aligned unitary component. The image sensor 201 resides on a substrate 202 to which is attached a sleeve 203. The sleeve has a screw thread 204 in the example illustrated at FIG. 2. The holder 205 containing the lens train 206 has a mating screw thread 207. Rotating the holder with respect to the sleeve moves the entire lens train, in this example embodiment, along the optical axis 208 of the camera, permitting the focus to be set. Alternatives to the matching screw threads 204 and 207 include matching grooves and lands in various patterns permitting focus to be set continuously or discretely such as with a series of notches, spring-loaded pins or levers or elastic materials or other techniques to couple the lens train holder 205 with the sleeve 204 in a way that allows the distance between the image sensor 201 and one or more fixed lenses of the lens train 206 to be set.

A precision alignment in accordance with certain embodiments of the optical train permits transmission of images at high fidelity. Certain embodiments involve alignment of the various elements of the train, principally the lenses, with respect to tilt, centering and rotation with respect to one another to a certain degree of accuracy. While it is possible to achieve very exact alignment of one lens to another using active alignment techniques in certain embodiments, passive methods are used in certain embodiments, and typically wherever possible, due to the high speed of assembly and low cost of this approach. In the auto focus zoom module of certain embodiments, passive alignment tolerances are accommodated in all but one of the joints of the lens train.

Camera Module with Protective Cover

In certain embodiments, an optical surface can be added to the image sensor as a singulated component. This optical surface can serve as a cover, made of transparent glass or polymer, to prevent dust or other contaminant from the reaching the active surface of the sensor, while permitting visible light to get through to the sensor. The optical surface can also serve as an infrared (IR) filter, particularly for a silicon sensor. An IR absorbing material may be used for the cover or an IR coating may be applied to the glass or polymeric or other optically transparent protective cover. The optical surface can also be formed to provide optical power such as in the shape of a replicated lens. A process for forming the singulated component at the wafer stage before dicing is provided hereinbelow.

The component includes an active image sensor protected against contamination using wafer level hybrid optics. This approach has another advantage in that an overall physical Z height of the camera module may be reduced by incorporating such hybrid optics with the camera module component.

The active image area on the image sensor is protected in accordance with certain embodiments at the wafer stage before dicing or singulation of the image sensor wafer into discrete dies. This protection of the active image area is achieved in certain embodiments by attaching a glass wafer, such as a blue glass or IR coated glass, or other material such as a polymer or other material that is transparent to visible light and absorbs or otherwise blocks IR light. Further improved functionality of this glass protection is achieved by adding a wafer level optics element.

Figure 3A:
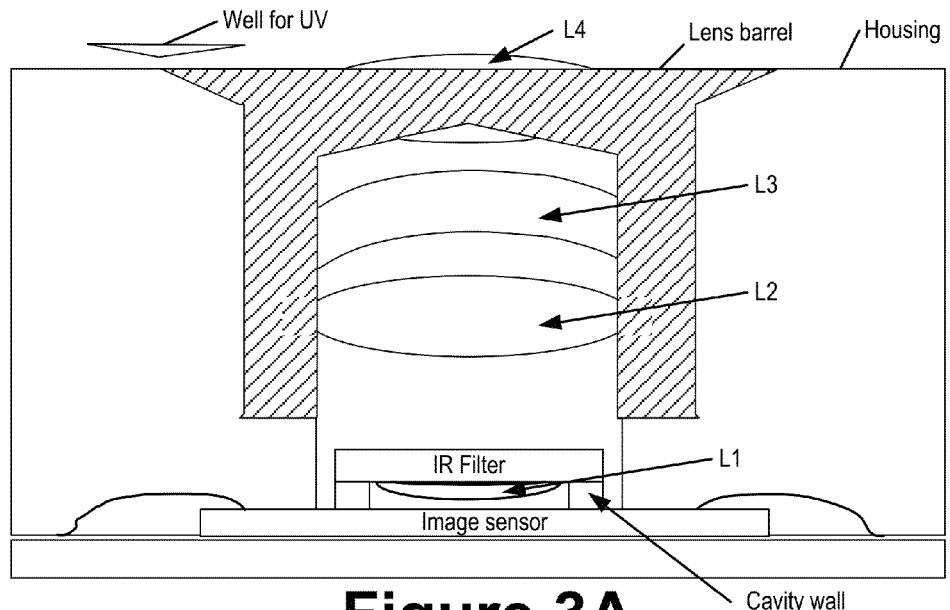
Figure 3B:
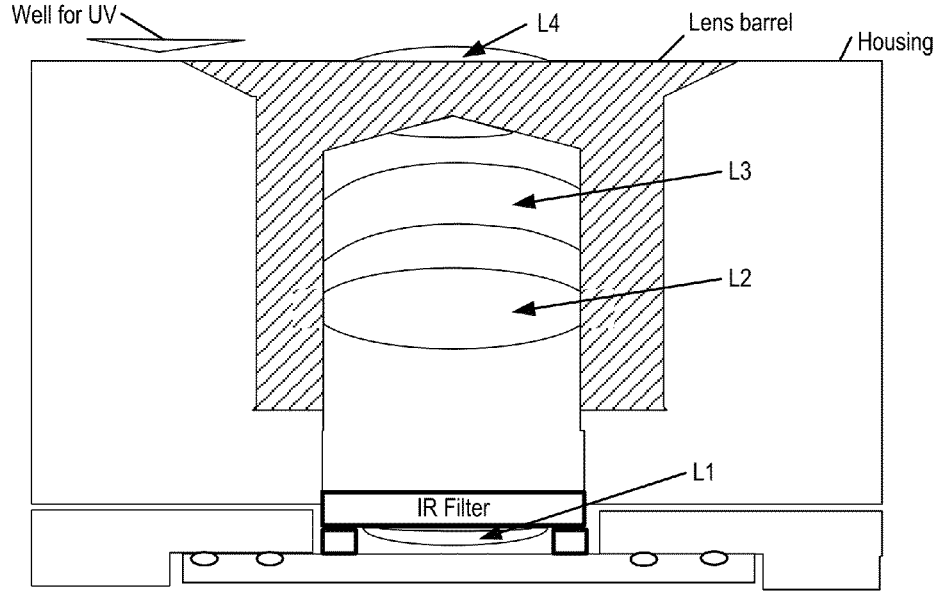

FIG. 3A schematically illustrates an example camera module that includes a wire bond coupled to the camera module component. FIG. 3B schematically illustrates an example camera module that includes a flip-chip. The example camera module illustrated schematically at FIG. 3B may use thermal compression or a thermosonic process. These are described in more detail at U.S. patent application Ser. No. 13/445,857, which is incorporated by reference.

In auto focus and optional zoom camera modules in accordance with various embodiments, processor-based components such as distortion correction components, chromatic aberration correction components, luminance, chrominance, and/or luminance or chrominance contrast enhancement components, blur correction components, and/or extended depth of field (EDOF) and/or extended or high dynamic range (EDR or HDR) components.

Figure 4A:
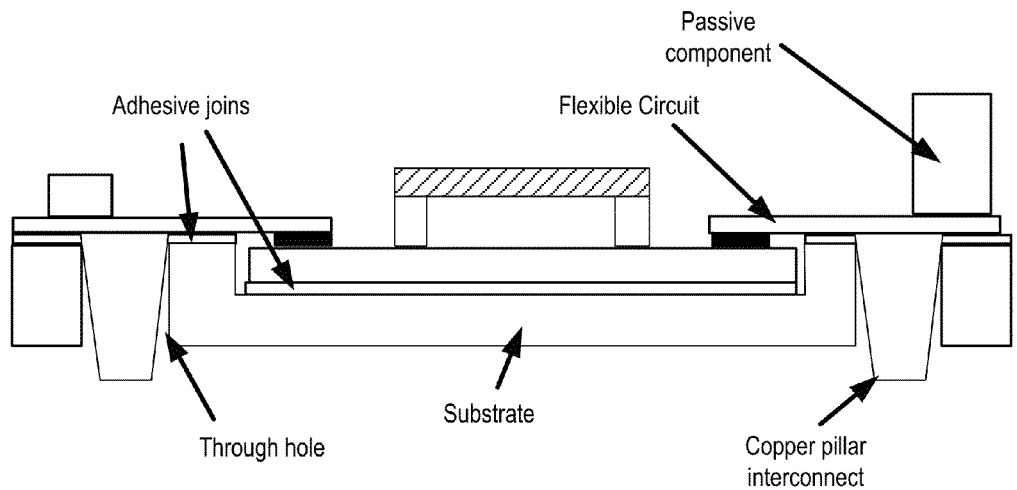
Figure 4B:
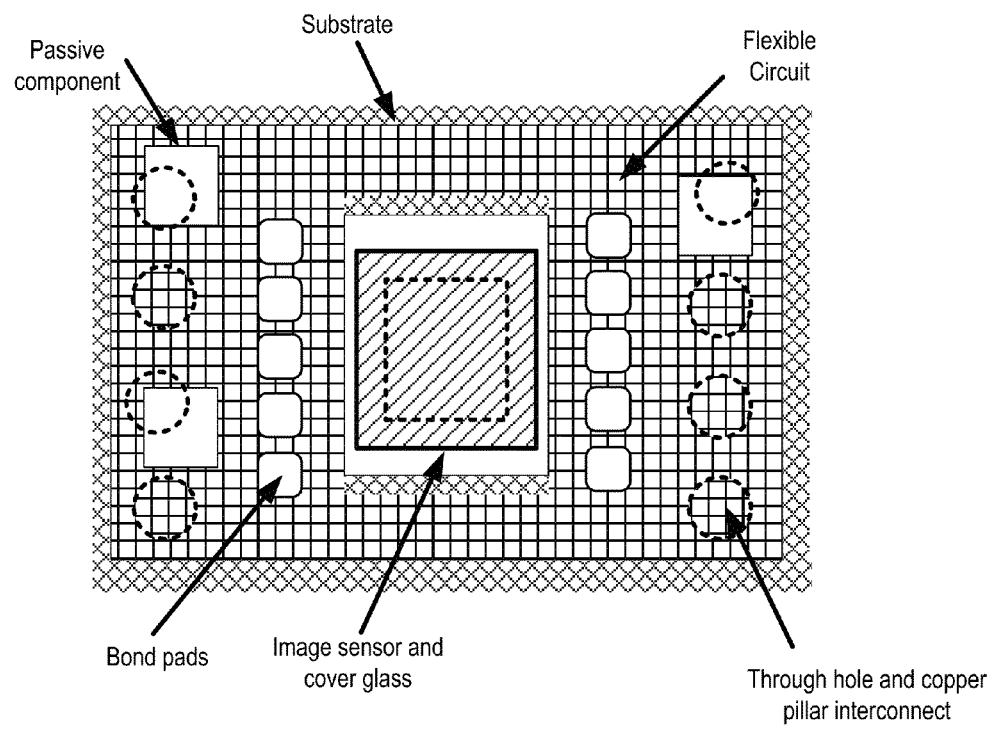

Another example is illustrated schematically at FIG. 4A and FIG. 4B, and is also described in detail at the Ser. No. 13/445,857 US application incorporated by reference above. FIGS. 4A-4B include structural components illustrated in section and plan view, respectively. A flat substrate forms the base of the camera module of FIGS. 4A-4B. A purpose of this substrate is to provide structural support, and so suitable materials include metals (e.g., titanium), ceramics (e.g., alumina) and hard polymers like Bakelite. The substrate material may be moulded or one or more other methods may be used to fabricate an array of through-holes in it. In certain embodiments, these through holes will eventually be fully or partially filled with conductive material as part of the structure that provides the electrical interface to the camera module. Because the substrate contributes to the overall height of the camera module, it is a very thin yet sufficiently rigid. The mechanical properties of the material of the substrate, including its modulus and fracture toughness, are carefully selected in certain embodiments. The substrate may be around 200 microns thick, and can have a thickness be in a range between approximately 50 microns and 400 microns.

The image sensor and cover glass are coupled over roughly a central portion of the substrate in the example embodiment illustrated at FIGS. 4A-4B. The image sensor may be attached to the substrate using adhesive bonding or magnetically, or using one or more clips or complementary slide or twist fastening components, or using fit bonding utilizing static adhesion or thermal or compression shrink or expansion fitting, or otherwise. Over a substantial portion of the remainder of the substrate, in this example, is attached a flexible circuit. The method of attachment may be adhesive bonding or one of the just mentioned methods or otherwise. The flexible circuit may include in certain embodiments thin conductive tracks made of copper or other metal or conducting polymer on the surface of and/or embedded within a soft polymeric material like polyimide. Apertures or other features may be used to provide access to the copper tracks to make electrical connections.

As illustrated in the example of FIGS. 4A-4B, the flexible circuit has an aperture that is smaller than the image sensor in plan area. This permits the flexible circuit to be placed over the image sensor, such that the bond pads on the image sensor are covered by the flexible circuit. In this way, electrical joins may be made between the bond pads on the image sensor and suitable lands on the flexible circuit. A wide choice of methods and materials are used in accordance with several embodiments to effect such joins, with examples including conductive adhesives, thermo-compression bonds, soldered joints, and ultrasonic welds.

The image sensor is connected or connectable electrically to the flexible circuit, enabling tracking on a flexible circuit in accordance with certain embodiments to be used to route electrical connections to other sites, which may include active and/or passive components. Active and/or passive components can be attached and interconnected to the flexible circuit in various embodiments using established methods and techniques. In FIGS. 4A-4B, three (3) passive components are included in the camera module, along with ten (10) bond pads and eight (8) through-hole solder interconnects, but these numbers and locations and shapes and sizes are provided by way of illustration and many variations are possible.

External electrical connection to the camera module involves in certain embodiments electrical connection to suitable lands on the flexible circuit. By design, these lands are advantageously located over the through holes in the substrate. Although FIGS. 4A-4B depict pillars of copper for these electrical interconnects, the electrical interconnects could be fabricated from a variety of materials and structures including solder pillars, stacked stud bumps, conductive adhesives and/or deep access wire bonds. Other embodiments include mechanical structures like sprung elements and pogo pins. Where solder pillars are used, on reflow of the solder, the periphery will change shape into a hemisphere so that the external interface of the camera module resembles an interconnect for semiconductor packages similar to a ball grid array. The example structure shown in FIGS. 4A-4B includes a flexible circuit that has a slight bend, while in other embodiments, the flexible circuit does not have a bend.

FIGS. 4A-4B schematically illustrate an image sensor that is disposed in a recess in the substrate, such that image sensor bond pads are on the same level as the underside of the flexible circuit, although in other embodiments, there may be an offset. Some adjustment to the detail of this alignment may take into account the thickness of the joining medium used to attach and connect the flexible circuit to the bond pads.

MEMS Fast Focus

Figure 5:
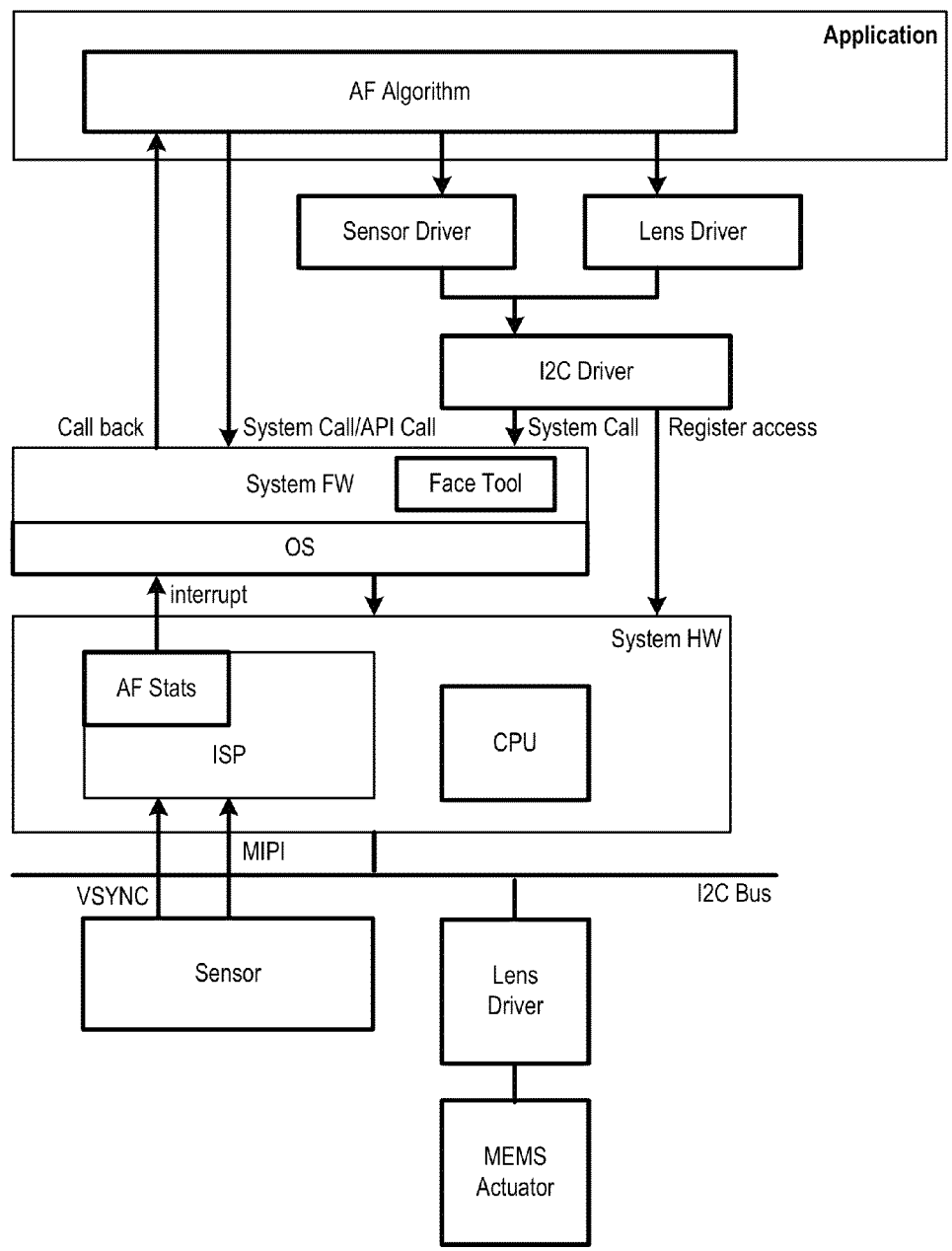
FIG. 5 illustrates an example of an auto focus system architecture in accordance with certain embodiments.

Auto focus (AF) can be sub-divided into at least two types: one being active AF which typically involves additional parts like as IR LED and sensor, and another being Passive AF or TTL AF (Through The Lens AF), which uses the actual image acquired by the sensor to detect object distance. Auto focus camera modules in accordance with certain embodiments include compact digital still cameras and mobile phone cameras that use a "Contrast Measurement Method" which is a sub-type of "Passive AF", while other methods are used in other embodiments. FIG. 5 illustrates schematically combined hardware or H/W (lower) and software or S/W (upper) in a system architecture of an auto focus mechanism. Software is typically implemented in ISP.

A mobile phone camera may use a CMOS sensor as an image sensor. A CMOS sensor may use rolling shutter during preview. After finishing frame data transfer and calculating statistics for AF of the frame, the system may provide data to an AF component or algorithm or application, that includes a callback feature. In a callback interface, the AF component evaluates image contrast, decides next focus position (video) or final focus position (still image capture), and controls the actuator via lens driver software task (that programs the lens driver IC).

Advantageous auto focus camera modules with MEMS actuation in accordance with certain embodiments are fast enough to move the lens within a single frame acquisition cycle without interfering with the exposure and data-transfer from the sensor. At HD data rates, 80%+ of the image frame cycle (33 ms) is needed to move data from sensor to ISP and onto the main system memory.

MEMS actuators that may be used in various embodiments are described at U.S. Ser. No. 61/622,480 and PCT/US12/24018, which are incorporated by reference, and other embodiments of MEMS actuators and camera module including MEMS actuators are described in references cited and incorporated by reference hereinbelow.

Figure 6:
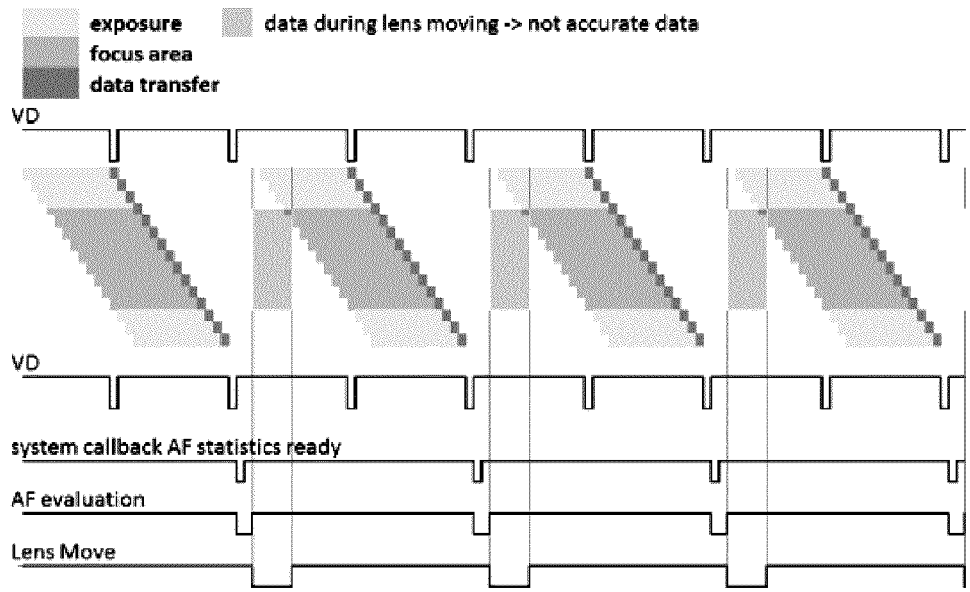
FIG. 6 illustrates a timing diagram for an example of an auto focus camera module that is programmed to move the subset of movable lenses once per frame of a preview image stream based on a focus area being applied to a central region of a scene in accordance with certain embodiments.

An advantage of MEMs is its quickness as illustrated in the timing diagram of FIG. 6. FIG. 6 illustrates a timing diagram for an example of an auto focus camera module that is programmed to move the subset of one or more movable lenses once per frame of a preview image stream based on a focus area being applied to a central region of a scene in accordance with certain embodiments.

The MEMS actuator is fast enough, in combination with an exposure time being shortened during AF as well as a data transfer frame rate also being fast, so that AF achieves both good speed and accuracy within a single frame cycle (<33 ms for 30 fps) in auto focus camera modules in accordance with certain embodiments.

The "focus area" is shown in FIG. 6 as being applied to the central region of the image (orange/brown region). Thus in this example the lens can still be moving during the first 20% of the acquisition cycle for the next image frame (top yellow regions). The lens can also begin moving during the last 20% of the acquisition cycle (bottom yellow regions) because these initial and final lines of the image data are not used to determine focus in certain embodiments.

The image may be initially partially blurred or distorted due to lens motion. However, the AF component of camera modules in accordance with certain embodiments advantageously determines its "sweet spot" within a handful of image frames and is stable thereafter.

The MEMS is so fast, that in certain embodiment under certain conditions, the AF camera module is not refocused on every image frame. In other embodiments, where the lens is to be moved on every image frame, some additional smart processing is included that avoids any unpleasant "focus hunting" where the focus could otherwise be constantly oscillating due to being overly sensitive.

Relationship Between Sensor+AF, ISP, System Memory and CPU/GPU

Figure 7:
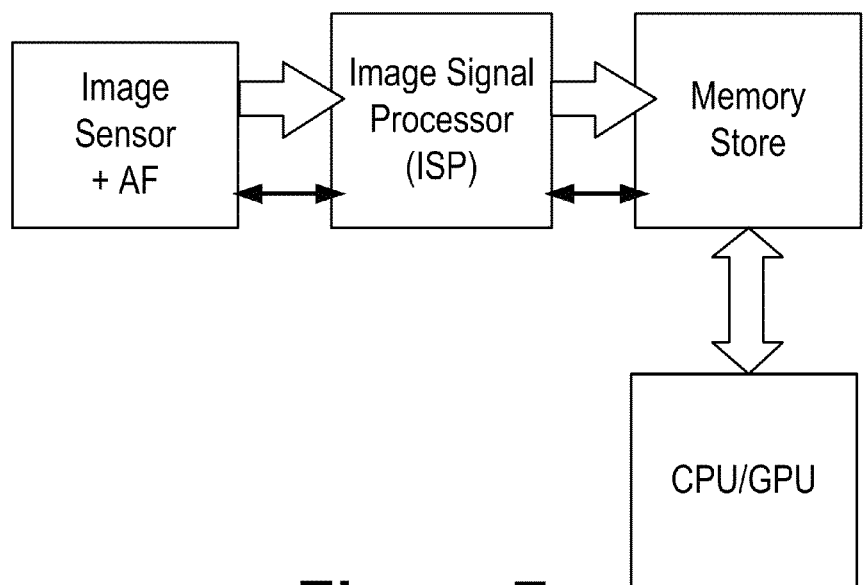
FIG. 7 illustrates certain components of an imaging hardware architecture in accordance with certain embodiments.

FIG. 7 illustrates certain components of an imaging hardware architecture in accordance with certain embodiments. AF statistics and algorithm component may be typically implemented in the ISP and in those embodiments the ISP provides instructions to the AF hardware to drive the lens to its updated position. The ISP is designed to process sensor data as it passes through to the main system memory The data can alternatively be passed to a Host memory, e.g., via a MIPI I/F or the ISP can look to the Host as a sensor, e.g., for a sensor parallel interface, in certain embodiments.

The ISP is linked in certain embodiments to the image sensor by a dedicated high-speed bus and the ISP buffers sensor data in a multi-line buffer. Image data may be processed by the ISP as it passes through this buffer architecture and statistical data is accumulated and/or retained within ISP for the current image frame. ISP may have some retained data on past image frames, but this is typically high-level statistical data or image characteristics determined from these.

ISP also modifies raw image data, e.g., to de-Bayer the R-G-G-B sensor data, converting to RGB or YCC format. ISP may also adjust image sharpness, white balance, color balance and perform some limited filtering such as noise suppression, gain adjustment and adaptive filters. The ISP may also implement other high level image processing and analysis functions such as face detection and tracking, and smile and blink detection and/or other techniques described in patents and patent applications incorporated by reference below.

AF Algorithm Layer

Camera modules in accordance with certain embodiments utilize "Single AF" or "Continuous AF." Single AF techniques involve one AF operation with a certain trigger such as a shutter for still aquisition. Continuous AF techniques involve performing AF continuously during preview or video capture.

Full Traversal and Hill Climb AF

Figure 8:
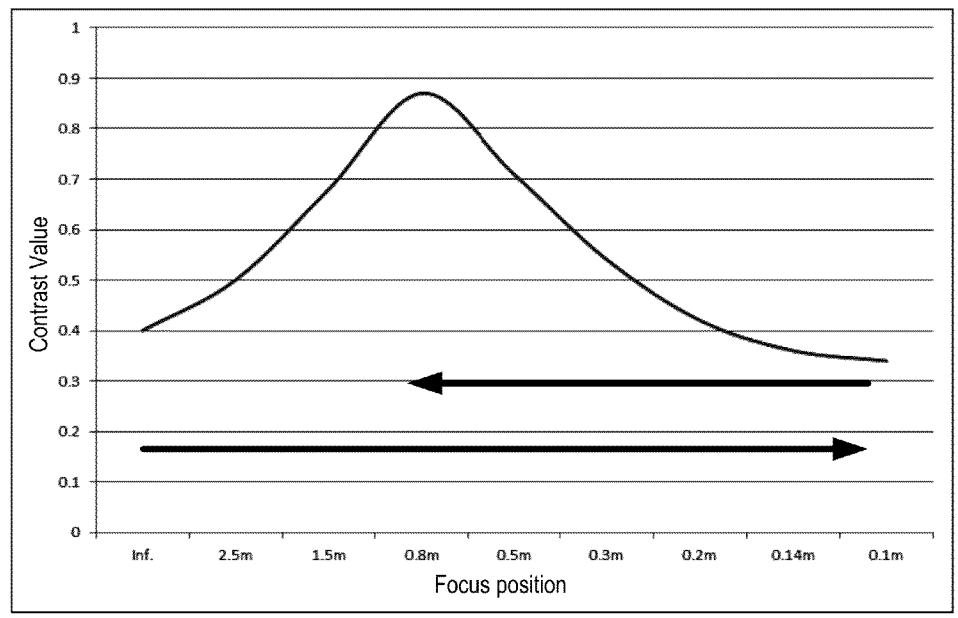
FIG. 8 is a plot of contrast value versus focus position for a full traversal auto focus mechanism of a camera module in accordance with certain embodiments.

Full Traversal AF techniques scan an entire focus range (e.g., using a full traversal of a movable lens or lens barrel of a camera module). An example of a timing diagram for a Full Traversal AF technique is provided at FIG. 8. A contrast value of a region of interest or ROI window from infinity to macro is determined. The lower, longer black line with arrow pointing to the right represents the full focus range of travel of the focusing lens, lenses or lens barrel of the auto focus camera module in this embodiment. A peak focus measure is found. The lens, lenses or lens barrel is moved back to focus position with optimal focus measure (typically the peak contrast value). This movement back from macro to the position of optimal focus or peak contrast is illustrated by the upper, shorter black line with arrow pointing to the left in FIG. 8. The total distance traveled by the lens during the Full traversal AF process can be estimated as the sum of the distances represented by the two black lines multiplied by the average speed. The full traversal AF technique can take more time to move the lens, lenses or lens barrel than a technique that utilizes less than the entire focus range, although finding the peak is often more straightforward than with other approaches. Because there is a risk that objects and people in the scene may change during the focusing cycle, it is desired in certain embodiments to reduce focusing time.

Figure 9:
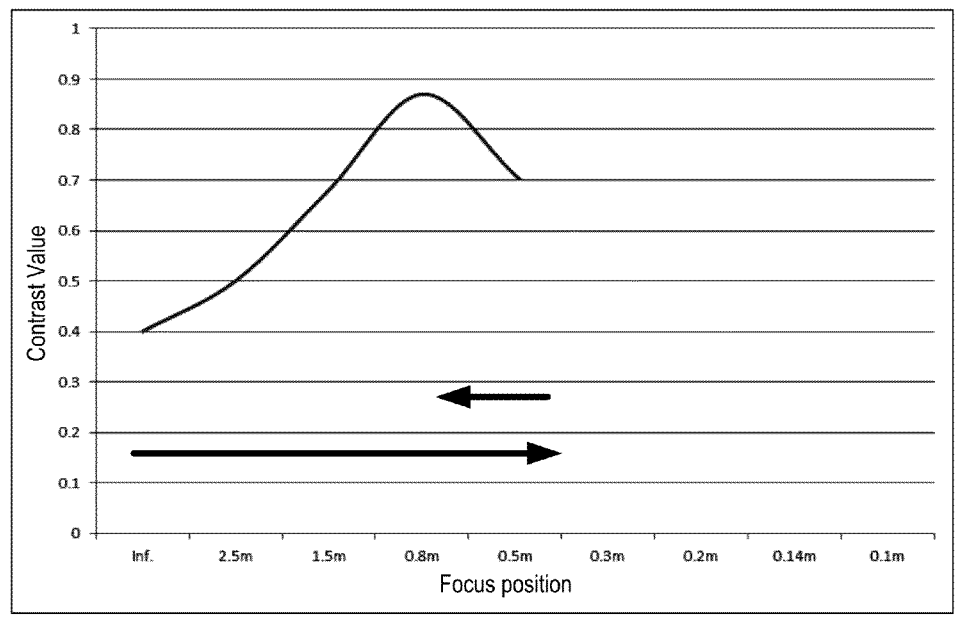
FIG. 9 is a plot of contrast value versus focus position for a hill climb auto focus mechanism of a camera module in accordance with certain embodiments.

A Hill Climb AF technique may be adopted in certain embodiments to reduce focusing time compared with the Full Traversal AF. An example of a timing diagram is provided at FIG. 9 to illustrate a Hill Climb AF technique. In the Hill Climb AF technique, image contrast is checked for a region of interest window from Infinity, moving back toward macro position. Once the algorithm detects a contrast decrease, which it should do just after the lens, lenses or lens barrel crosses the position that produces peak contrast and after the lens, lenses or lens barrel has traversed only a fraction of the entire focus range as represented by the lower black line with arrow pointing to the right in FIG. 9, then it steps back towards the peak as represented by the upper, short arrow pointing to the left in FIG. 9. The first steps through the focus range are relatively large in certain embodiments. After contrast decrease is detected a smaller step size is used. Even with a somewhat more complicated set of operations, focusing time is typically reduced when compared with full traversal AF, because a shorter distance is traveled by the lens during the Hill Climb AF technique than for the Full Traversal AF technique, as evidenced for example by the sum of the two black lines being far smaller in FIG. 9 than in FIG. 8. As long as the time is not increased too significantly by slowing the movement around the peak contrast position or by adding too much time to counter hysteresis (as described below), the hill climb AF technique can be used in advantageous combination with a MEMS-based auto focus camera module, optionally also having zoom. The embodiment illustrated at FIG. 2 may be selected when very fast auto focus is desired, because the single movable lens L3 in that embodiment has only a relatively short distance to traverse, as mentioned above. Many variations on the Hill Climb AF technique may be used in various embodiments with improved focus measures, or using data from a small number of initial AF steps to find the peak value using smart interpolation techniques such as bi-cubic or spline interpolation.

Figure 10:
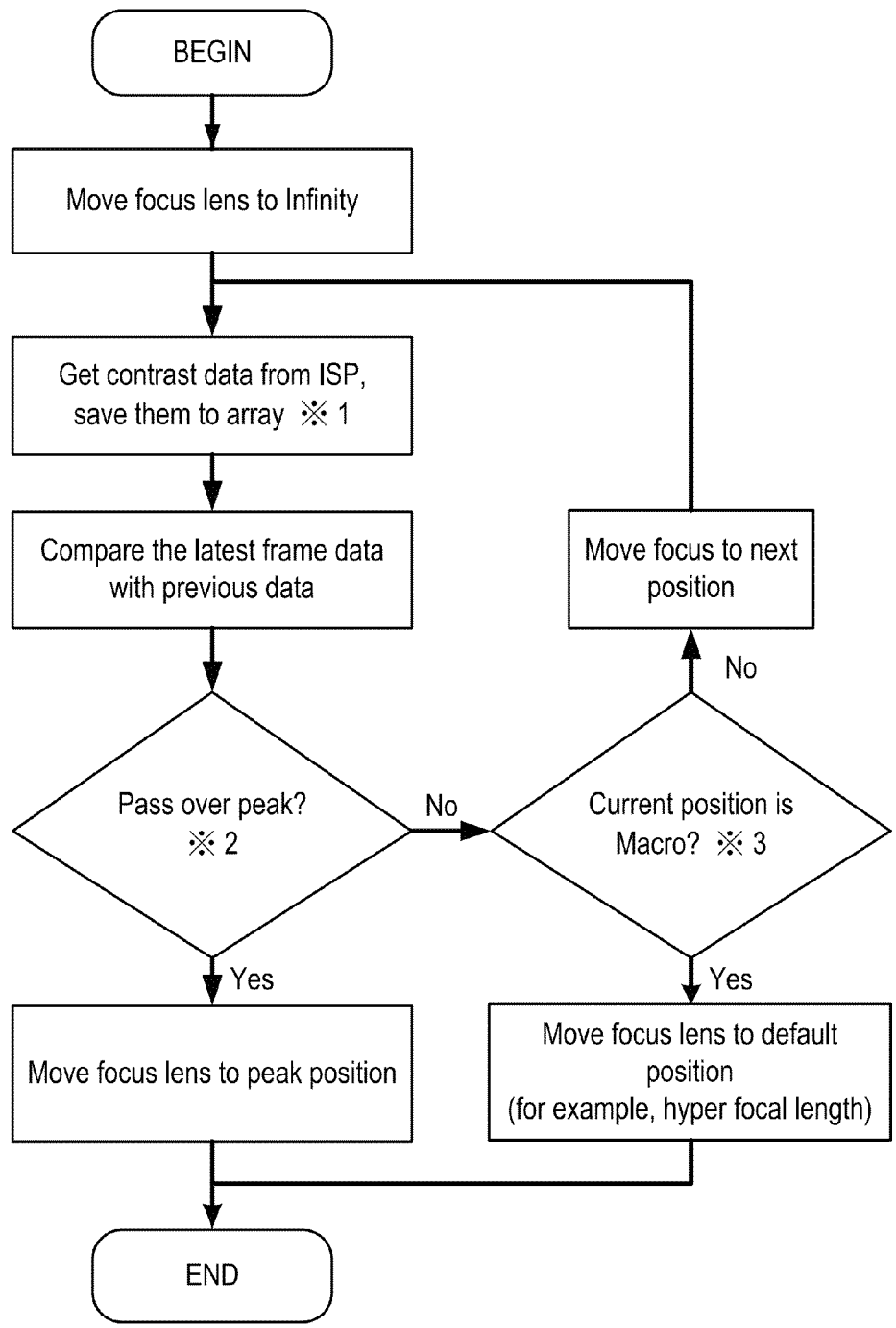
FIG. 10 is a flow diagram illustrating certain operations of a hill climb auto focus technique of a camera module in accordance with certain embodiments.

FIG. 10 includes a flowchart structure of an example of a Hill Climb AF technique that may be used in certain embodiments. A focus lens or lenses are moved to the extreme of a focus range of the camera. Contrast data are obtained from the image signal processor or ISP and saved to an array. For this example, it is assumed that region of interest or ROI (AF window) has been fixed. The latest frame data are compared with previous data. A determination is made as to whether a peak has been passed over. Contrast data have noise, so it may not show the peak that just the latest contrast data are smaller than ones of a previous frame. So, detecting the peak may involve using a threshold or checking a history of contrast data. If it is determined that a peak has been passed over, then the focus optic(s) is moved to the peak position and the AF ends. If it is determined that a peak has not been passed over, then it is determined whether current position is macro. In other words, the processor programmed by the AF algorithm could not find a peak. The focus length can either be moved to a next position, or if no peak is found over an entire focus range, then the system can retry the AF technique from the beginning, or the focusing optic(s) can be moved to a default position, e.g., hyper focal length.

Hysteresis

Figure 11:
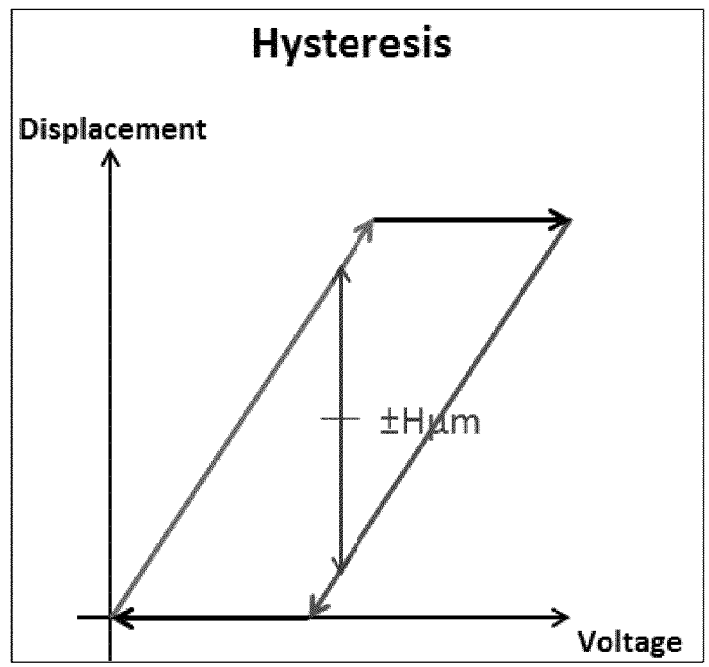
FIGS. 11-12 illustrate effects on lens movements of hysteresis in auto focus camera modules in accordance with certain embodiments.
Figure 12:
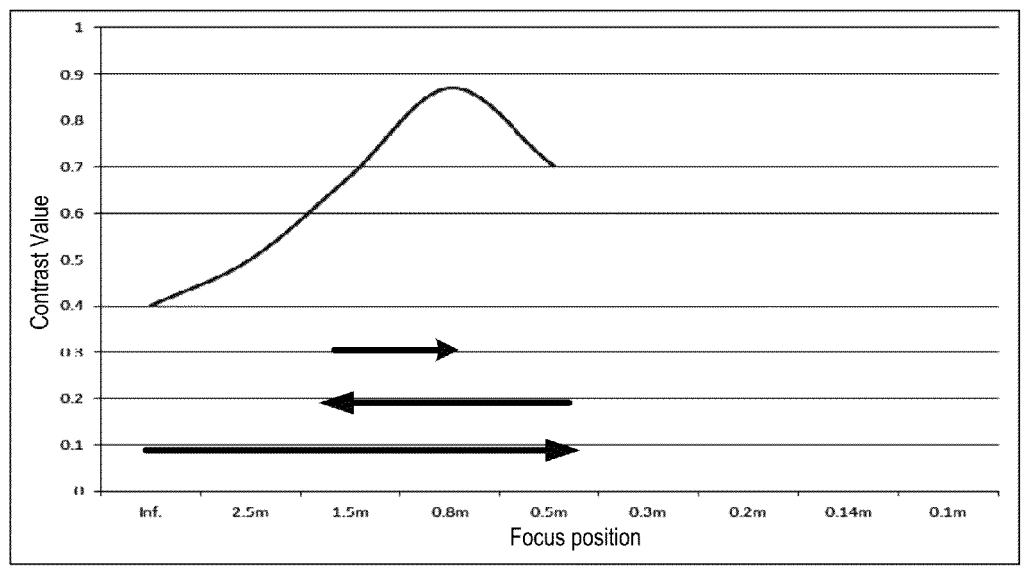

Hysteresis is illustrated in FIG. 11 and is defined as a difference in lens position when a same voltage is applied on an actuator when moving the movable lens, lenses or lens barrel from macro to infinity position and then in the opposite direction from infinity to macro position. Notably, MEMS actuators that are included in auto focus camera modules in accordance with certain embodiments include three microns or less hysteresis. In comparison, VCM actuators often have twenty microns or more hysteresis, which is so much hysteresis that an AF technique may add a step of going back over the peak, and moving to peak again after finding the peak as in the illustrative example of FIG. 12. This adds a little distance to the overall sum by adding a third movement back toward macro as illustrated by the upper, shortest of the three black arrows in FIG. 12 to the sum that was determined of only the other two arrows with reference to the example timing diagram of FIG. 9, but increases the difference compared with VCM auto focus due to the greater difficulty involved in finding the contrast peak with sufficient precision in that far higher hysteresis environment.

The basic concept of Continuous AF is approximately the same as Single AF. However, unnecessarily frequent re-focusing should be avoided as problematic, particularly for video acquisition. A threshold can be predetermined wherein small enough variations in the scene or the focus window would not trigger re-focusing, while if the algorithm is sensitive, it can be changed on each image frame. Accordingly, some algorithm adjustments are provided in certain embodiments of Continuous AF techniques to achieve certain desired results.

Scene Change Detection

A scene change detection component may be used in a Continuous AF technique in certain embodiments that can serve to avoid frequent focus movements. This can set a threshold for the change in scene before new focus movements are requested.

Predictive Face AF

In certain embodiments, information derived from detected face images in a scene are used to assist in providing estimates of face distances and face locations in an image frame. Face-based techniques are combined with MEMS AF techniques, particularly as hysteresis is relatively low and repeatability is high with auto focus camera modules that include MEMS actuators. If integration with face-tracking is implemented then smarter algorithms are possible.

Additional information on predicted face regions within image frames is coupled with statistical face tracking data in certain embodiments and can be used to inform the AF algorithm, when tracked face regions are available. This also enables accurate scene change detection particularly when people and/or faces are often the main source of scene changes. As an example, eye-to-eye distance changes can be determined from frame-to-frame, providing both distance and velocity metrics for a tracked face region. This information helps avoid focus searching in the wrong direction. Where multiple face regions are tracked there are various options, e.g., focus may be based on the closest face, the most central face, a longest tracked face, an average across multiple faces, or other preset criteria. With a touch screen interface, in certain embodiments, the user may select a face region to prioritize.

Hardware Face Tracking within ISP

Hardware add-ons for ISP may be implemented which can extract local image primitives and apply multiple parallel object classifier templates to buffered image data as it passes through the ISP (see, e.g., US published patent applications serial numbers 20120120304, 20120106790, and 20120075504, which are incorporated by reference).

In one embodiment, potential (rectangular) face regions are determined. This data is written with an original image frame to system memory for subsequent processing by a main system CPU or GPU. This data is retained in certain embodiments and processed statistically over multiple image frames at ISP level, or within a hardware "add-on" to the ISP. This is used to provide a hardware face tracking mechanism in certain embodiments which can determine predicted locations of a face in later image frames. As the main CPU typically will configure a local hardware module from time to time, e.g., to assist high-level face analysis functions by loading different classifier templates in certain embodiments, it is possible to obtain occasional confirmations from other algorithms running on main CPU/GPU. Classifier templates are not restricted to faces. Classifier templates have been successfully implemented using the same architecture for eye-regions, hands, facial expressions (smile, blink) and for non-human objects including vehicles, animals, buildings and trees.

One particularly relevant classifier for certain applications is the "eye-pair" template to confirm a face region and provide, in addition, a more accurate indication of the size of the face region.

Figure 13:
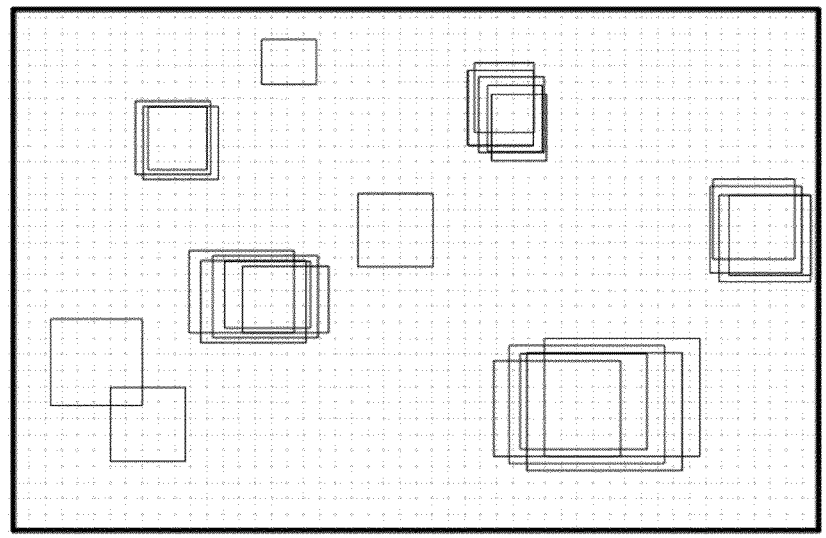
FIG. 13 illustrates a set of-detected or candidate face locations within a scene and/or on an image sensor or display over multiple preview or video frames in accordance with certain embodiments.

Referring now to FIG. 13, a set of detected face locations are illustrated as included rectangles within a large rectangular window that may represent an image boundary. These included rectangles are the result of matching multiple short classifier chains in parallel to a window of an image frame. The rectangular regions show where a potential face region has been detected when each of the illustrated rectangular windows successfully matches one of multiple short classifier chains applied in parallel to that window of the image frame. Regions with multiple, overlapping windows have higher probability of containing a face than regions with only one window or with fewer windows. In the example of FIG. 13, a significant number of single detections are noted, although these are unlikely to indicate a real face region if no other matches are determined at that location, because the individual classifier chains are designed in this example embodiment to be highly inclusive for a specific set of face characteristics, e.g., pose, in-plane rotation, and/or illumination.

Over multiple image frames, confirmations may be obtained for a set of candidate face regions and a history may be built. The history may include a recorded direction and degree of motion of a confirmed region. Thus, at the beginning of an image acquisition, the ISP can be informed as to where face regions were in a previous image frame or frames. These may have just been analyzed and an output similar to FIG. 13 may be available for the last frame. The ISP can also keep a statistical history of tracked face or other object regions in certain embodiments, as illustrated in the example of FIG. 14.

Figure 14:
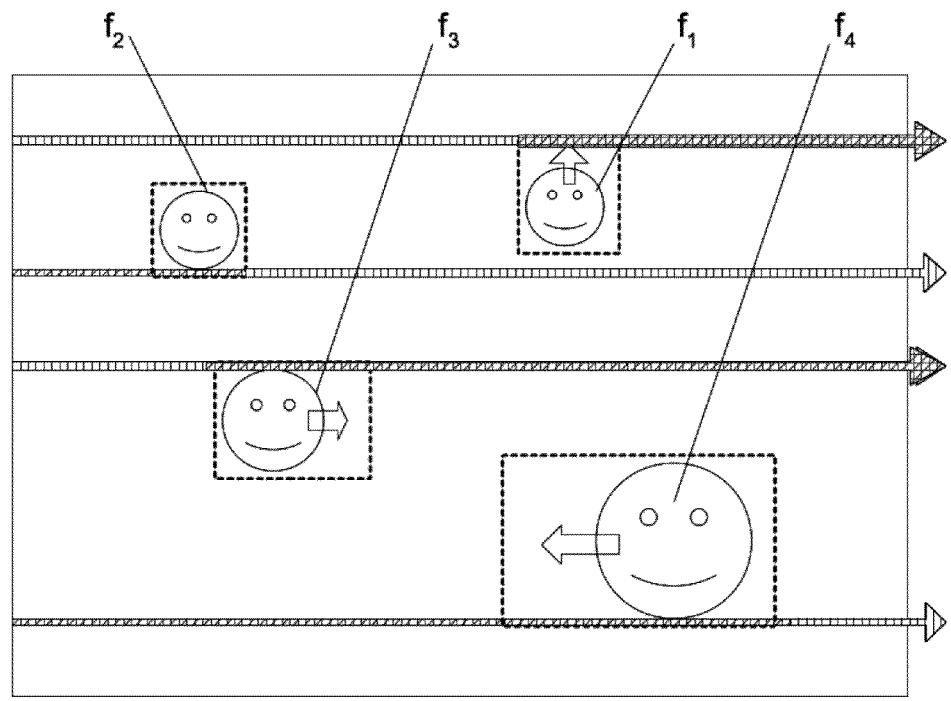
FIG. 14 illustrates a set of confirmed or candidate face regions showing a smiley face at the determined location based on a tracking history in accordance with certain embodiments.

FIG. 14 illustrates confirmed face regions showing at the locations where "smileys" appear within the large rectangular window based in certain embodiments on tracking history and/or a combination of tracking history and one or more additional criteria. Such additional criteria may include non-real-time confirmation from a more sophisticated and perhaps slower algorithm running on a main CPU. A focus distance or focus value for each of these faces or other objects or regions of interest (ROIs) can also be determined and recorded, e.g., as f1, f2, f3, and f4 in FIG. 14. The dashed lines in FIG. 14 indicate a predicted face region or a location where a face is expected to be in the image frame currently being acquired. This information may be based partly on historical tracking data, partly on determined current direction and/or speed of motion, and/or partly on the size (closeness to camera) of the tracked face. Note for example that f4 is moving with reasonable speed in the horizontal direction, while f3 is moving at a slower speed in the opposite still horizontal direction so the predicted face region is less extended in the direction of motion for f3 than for f4. FIG. 14 also indicates that f1 is moving slowly in the vertical direction, and that no movement is detected for f2 or that any movement detected for f2 is below a threshold minimum.

Figure 15:
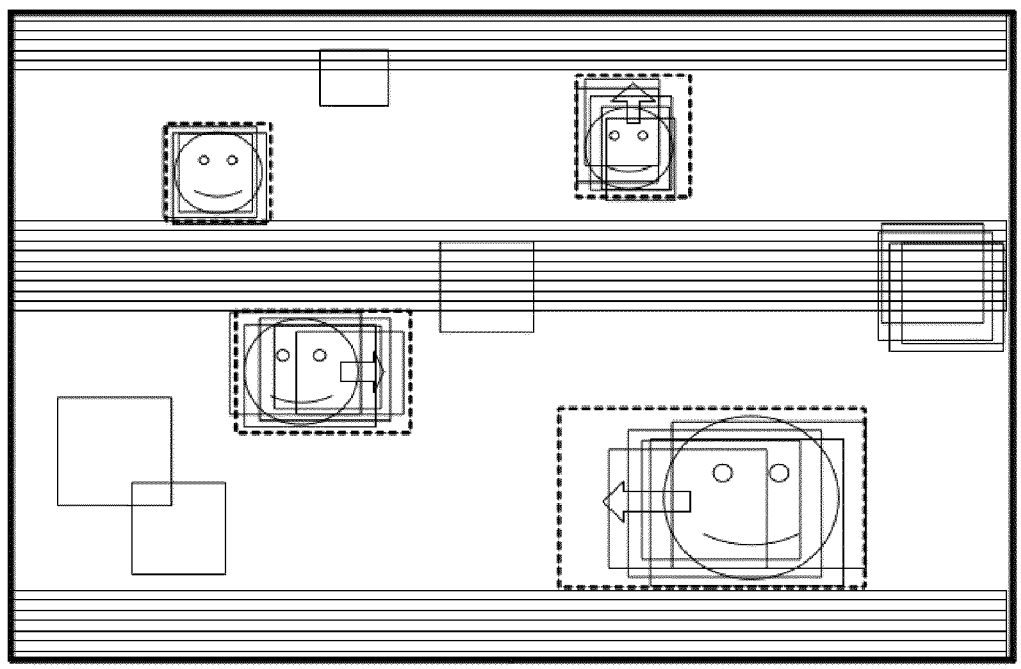
FIG. 15 illustrates overlap of tracked regions—from FIG. 14 with the detected face locations illustrated at FIG. 13

One aspect of face-based detection is that a MEMS-based auto focus camera module in accordance with certain embodiments can advantageously use one or more predicted face regions as ROIs for the AF algorithm. In the example shown in FIG. 14, there are four (4) regions each potentially with at least a slightly different focus setting, i.e., f1, f2, f3 and f4. A range of different approaches may be applied. In one embodiment,—focus position is based on a single value determined from all detected faces or a subset of detected or candidate face regions. In another embodiment, focus is determined based on or set to focus on a closest (largest) face; or on a most distant (smallest) face; or on a face located at a focus position which corresponds to an intermediate setting between closest and most distant. In another embodiment, the focus may be time based, e.g., the focus may be set to a most recently detected face; or on the longest detected face, or on a face that has maintained face-lock during tracking for a threshold time also with sufficient stability, or other parameters, criteria or combinations FIG. 15 illustrates an overlap of the tracked rectangular regions having sizes in the directions of movement of the respective faces that scale with the speed that the face is moving within the scene from FIG. 14 with the multiple, overlapped in probable cases, single-frame detections of FIG. 13. Interestingly in this example, a somewhat likely new face region appears to have entered the image field from the right-side that has four single frame detection corresponding to matching four different short classifier chains, even though a face tracking lock is not indicated as having been established, e.g., by providing a dashed rectangle that scales with movement direction and speed, such that there may be no statistical data, nor associated predicted region corresponding to that location.

Specialized hardware is provided in certain embodiments to filter objects such as faces, and/or that can be trained to detect any of a wide variety of objects and object types. The templates encode a number of object features that may describe only loosely the object, e.g., to balance a desire not to miss candidate objects and to run the process quickly. A second processing step may be performed by the SW using higher quality templates on any candidate regions. For example, the hardware templates can be trained with most commonly interesting objects (e.g. buildings, cars, people, pets, favorite sports teams, etc.) and the output from the object matching HW block can be used as input into the AF algorithm (as ROIs). In fact in certain embodiments, these ROIs are utilized as being very suitable for computing also certain chromatic measurements that could help computing approximate distances to each of those individual ROIs and thus helping with fast positioning of the lens.

ISP-Implemented Face Focus Techniques

In certain embodiments, an image signal processor or ISP is advantageously programmed to control an AF algorithm, so that the exposure cycle of the first pixel of the first predicted face region is neither blurred nor distorted by lens movement, or at least any such blurring or distortion is minimized or kept small. ISP control of the exposure cycle of an image sensor may involve responsibility to reset a sensor rolling-shutter at a correct time prior to start of a next data transfer cycle. When implementing face based AF, an ISP in accordance with this embodiment may also have knowledge of predicted face regions for a current image frame and may also control lens motion via an AF algorithm.

The ISP determines in certain embodiments when the first pixel of the first face region will be reset and ensures that lens motion does not occur during its exposure cycle. If the determined lens motion cannot be completed within this timeframe, an exception is triggered to the AF algorithm or task so that it is aware that an optimal lens position was not achieved. In one embodiment, an ISP provides a synchronization mechanism that is implemented such that the sensor I/F in the ISP signals to the rest of the ISP (either HW blocks or onboard CPU) when the ROIs exposure started and when it has been completed. The ISP should take care not to allow LENS movement during the exposure of the AF ROIs. New MEMS optimized ISPs are provided in certain embodiments that implement this signaling mechanism.

Lens motion ceases during that portion of image acquisition during which predicted AF ROIs are acquired. Once the last pixel of the last predicted ROI is acquired, then the ISP may re-initiate lens motion in certain embodiments. Typically, however, the AF algorithm or task programs the ISP to first finish both computing focus metrics on each of the detected face regions and determining an overall focus metric. Based on this new focus metric, the ISP decides if lens position is not optimal and should be further adjusted.

Depending on one or more timings of the exposure cycle and the template matching cycle in certain embodiments, the AF algorithm may program the ISP to wait for additional confirmation that predicted face regions did, in fact, contain a face during the current cycle before deciding if a focus adjustment is to be initiated. In some embodiments, a further delay may be implemented when a newly detected face region waits to be confirmed by more sophisticated CPU/GPU algorithms, or one or more additional image frames are used by the ISP to enable statistical data to be established on a new region.

Figure 16:
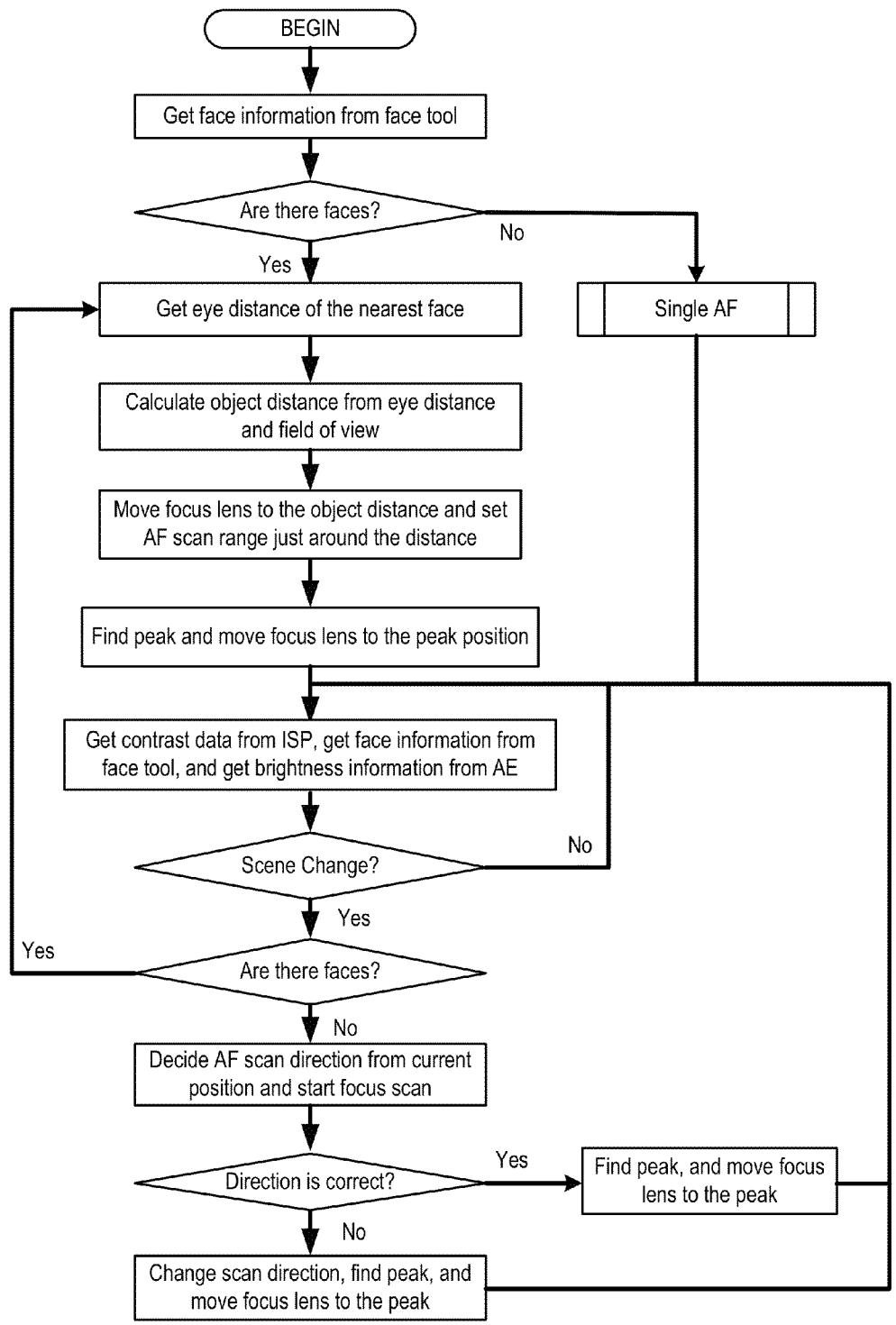
FIG. 16 illustrates a face tracking technique for an auto focus camera module in accordance with certain embodiments.

An example of a flowchart of a face-based autofocus algorithm in accordance with certain embodiments is provided in FIG. 16.

This algorithm is based on a software embodiment of the face tracking algorithm, but it can be seen how this can easily be replaced by the hardware template matching module and ISP-level firmware to speed up the face information and eye-distance components.

Re-Focus within a Single Image Frame

The speed of MEMs not only enables re-focus from frame to frame, but also allows re-focusing within a single frame in certain embodiments. Blur or distortion to pixels due to relatively small movements of the focus lens are manageable within digital images. Micro-adjustments to AF are included in certain embodiments within the same image frame serving, e.g., to optimize local focus on multiple regions of interest. In this embodiment, pixels may be clocked row-by-row from the sensor and sensor pixels may correspond 1-to-1 with image frame pixels. Inversion and de-Bayer operations are applied in certain embodiments.

Referring back to FIG. 14, four horizontal lines are indicated that represent lines of pixels and terminated each with an arrow-head indicating these pixels are heading for the ISP after they are clocked from the sensor in sequence. Pixels are clocked out row-by-row from the top down and from left to right across each row in certain embodiments. Looking to the top row, pixels to the left of the first predicted face region (f1) are 'clear', whereas pixels to the right of the first pixel of this ROI are blue/dark. Lens motion is ceased during the exposure interval of these 'dark' pixels to avoid lens-motion blur/distortion. The lens remains still while all intermediate rows of the sensor down to the last pixel of the second face region (f2) are exposed in this example. However, once the last data pixel of f2 is clocked to the ISP, the lens could begin to move again, although the lens motion would be ceased again to allow the first pixel of the third face region (f3) time to complete exposure. Thus if the time for two exposure intervals is longer than the time gap to offload data from f2 to f3, there will not be sufficient time for lens motion between f2 and f3. The physical overlap of rows of f1 and f2, and also of f3 and f4, in the example of FIG. 14, does not allow any lens motion between these ROIs. Re-focus within a frame may be provided in certain embodiments when the exposure time of individual pixels is quite short compared with the full image acquisition cycle (e.g., 33 ms).

Alternating Focus Techniques

In another advantageous embodiment, focus is switched between face regions for alternating image acquisitions. In an example of this embodiment, the lens may be moved to an intermediate position that lies approximately midway to the four focus settings, f1, f2, f3, and f4 in FIG. 14. Then, on each successive image frame the focus is moved to the optimal focus for each face region. This cycle is continued on subsequent image acquisitions.

The resulting image stream has a sharp focus on one of the four face regions in successive image frames while other regions of the image are less sharply focused.

US published patent applications nos. US20110205381, US20080219581, US20090167893, and US20090303343 describe techniques to combine one or more sharp, underexposed images with one or more blurred, but normally exposed images to generate an improved composite image. In this case, there is one sharply focused image of each face or other ROI and three more or less slightly defocused images of the face or other ROI. In certain embodiments, an improved video is generated from the perspective of each face or other ROI, i.e., with each face image in optimal focus throughout the video. One of the other persons can change the configuration to create an alternative video where the focus is on them instead.

In another embodiment, a similar effect is obtained by using two cameras including one that is focused on the subject and one that is focused on the background. In fact, with a dual camera in accordance with this embodiment, different focus points are very interesting tools for obtaining professional depth 2D video footage from an ordinary or even cheap 3D camera system (e.g., on a conventional mobile phone). Alternatively, a single camera with sufficiently fast focus could be used to obtain the same images by switching focus quickly between the subject and background, or between any two or more objects at different focus distances, again depending on the speed of the auto focus component of the camera. In the embodiments described above involving scenes with four faces, the AF algorithm may be split across these four different face regions. The fast focus speed of an auto focus camera module that includes a MEMS actuator in accordance certain embodiments would be divided among the four face regions so as to slow the auto focus for each face region by a factor of four. However, if that reduction by four would still permit the auto focus to perform fast enough, a great advantage is achieved wherein video is optimized for each of multiple subjects in a scene.

In a video embodiment, the camera is configured to alternate focus between two or more subjects over a sequence of raw video frames. Prior to compression, the user may be asked (or there may be a predetermined default set for a face before starting to record) to select a face to prioritize or a face may be automatically selected based on predetermined criteria (size, time in tracking lock, recognition based on database of stored images and/or number of images stored that include certain identities, among other potential parameters that may be programmable or automatic. When compressing the video sequence, the compression algorithm may use a frame with focus priority on the selected face as a main frame or as a key frame in a GOP. Thus the compressed video will lose less detail on the selected "priority" face.

In another embodiment, techniques are used to capture video in low-light using sharp, underexposed video frames, combined with over-exposed video frames. These techniques are used in certain embodiments for adapting for facial focus. In such an embodiment, the first frame in a video sequence is one with a focus optimized for one of the subjects. Subsequent frames are generated by combining this frame with 2nd, 3rd, and 4th video frames (i.e., in the example of a scene with four face regions) to generate new 2nd, 3rd, 4th video frames which are "enhanced" by the 1st video frame to show the priority face with improved focus. This technique is particularly advantageous when large groups of people are included in a scene.

In a different context, such as capturing video sequences from the rides at a theme park or social gatherings or baseball or soccer games, or during the holidays, or in a team building exercise at the office, or other situation where a somewhat large group of people may be crowded into video sequences. The raw video sequences could be stored until a visitor is leaving the park, or goes to a booth, or logs into a website and uses a form of electronic payment or account, whereon the user can generate a compressed video that is optimized for a particular subject (chosen by the visitor). This offers advantageously improved quality which permits any of the multiple persons in the scene to be the star of the show, and can be tremendously valuable for capturing kids. Parents may be willing to pay for one or more or even several "optimized" videos (i.e., of the same raw video sequence), if there are demonstrable improvements in quality of each sequence at least regarding one different face in each sequence.

Techniques Using Eye or Other Facial Sub-Region Information

Eye regions can be useful for accurate face focus, but as the eye is constantly changing state it is not always in an optimal (open) state for use as a focus region. In one embodiment a hardware template matching determines if an eye region is open and uses this as a focus region and the ISP applies a focus measure optimized for eye regions, and if the eye is not sufficiently open, then it defaults to a larger region such as the mouth or a half face or full face and uses a corresponding focus measure.

In a portrait mode embodiment, a camera module may use multiple focus areas on specific face regions, e.g., two or more of a single eye, an eye-region, an eye-nose region, a mouth, a hairline, a chin and a neck, and ears. In one embodiment, a single focus metric is determined that combines the focus measure for each of two or more specific facial sub-regions. A final portrait image may be acquired based on this single focus metric.

In an alternative embodiment, multiple images are acquired, each optimized to a single focus metric for a sub-region of the face (or combinations of two or more regions).

Each of the acquired frames is then verified for quality, typically by comparison with a reference image acquired with a standard face focus metric. Image frames that exceed a threshold variance from the reference are discarded, or re-acquired.

After discarding or re-acquiring some image frames a set of differently focused images remain and the facial regions are aligned and combined using a spatial weighting map. This map ensures that, for example, the image frame used to create the eye regions is strongly weighted in the vicinity of the eyes, but declines in the region of the nose and mouth. Intermediate areas of the face will be formed equally from multiple image frames which tend to provide a smoothing effect that may be similar to one or more of the beautification algorithms described at US published patent application no. US20100026833, which is incorporated by reference.

Techniques employed to generate HDR images and eliminate ghosting in such images, e.g., PCT/IB2012/000381, which is incorporated by reference, is advantageously combined with one or more of the fast auto focus MEMS-based camera module features described herein. The images utilized will include images with similar exposures, especially in portrait mode, while some of the exposure adjustment steps would be obviated in a portrait mode environment.

While an exemplary drawings and specific embodiments of the present invention have been described and illustrated, it is to be understood that that the scope of the present invention is not to be limited to the particular embodiments discussed. Thus, the embodiments shall be regarded as illustrative rather than restrictive, and it should be understood that variations may be made in those embodiments by workers skilled in the arts without departing from the scope of the present invention.

In addition, in methods that may be performed according to preferred embodiments herein and that may have been described above, the operations have been described in selected typographical sequences. However, the sequences have been selected and so ordered for typographical convenience and are not intended to imply any particular order for performing the operations, except for those where a particular order may be expressly set forth or where those of ordinary skill in the art may deem a particular order to be necessary.

A camera module in accordance with certain embodiments includes physical, electronic and optical architectures. Other camera module embodiments and embodiments of features and components of camera modules that may be included with alternative embodiments are described at U.S. Pat. Nos. 7,224,056, 7,683,468, 7,936,062, 7,935,568, 7,927,070, 7,858,445, 7,807,508, 7,569,424, 7,449,779, 7,443,597, 7,768,574, 7,593,636, 7,566,853, 8,005,268, 8,014,662, 8,090,252, 8,004,780, 8,119,516, 7,920,163, 7,747,155, 7,368,695, 7,095,054, 6,888,168, 6,583,444, and 5,882,221, and US published patent applications nos. 2012/0063761, 2011/0317013, 2011/0255182, 2011/0274423, 2010/0053407, 2009/0212381, 2009/0023249, 2008/0296,717, 2008/0099907, 2008/0099900, 2008/0029879, 2007/0190747, 2007/0190691, 2007/0145564, 2007/0138644, 2007/0096312, 2007/0096311, 2007/0096295, 2005/0095835, 2005/0087861, 2005/0085016, 2005/0082654, 2005/0082653, 2005/0067688, and U.S. patent application No. 61/609,293, and PCT applications nos. PCT/US2012/024018 and PCT/IB2012/000381, which are all hereby incorporated by reference.

Components of MEMS actuators in accordance with alternative embodiments are described at U.S. Pat. Nos. 7,972,070, 8,014,662, 8,090,252, 8,004,780, 7,747,155, 7,990,628, 7,660,056, 7,869,701, 7,844,172, 7,832,948, 7,729,601, 7,787,198, 7,515,362, 7,697,831, 7,663,817, 7,769,284, 7,545,591, 7,792,421, 7,693,408, 7,697,834, 7,359,131, 7,785,023, 7,702,226, 7,769,281, 7,697,829, 7,560,679, 7,565,070, 7,570,882, 7,838,322, 7,359,130, 7,345,827, 7,813,634, 7,555,210, 7,646,969, 7,403,344, 7,495,852, 7,729,603, 7,477,400, 7,583,006, 7,477,842, 7,663,289, 7,266,272, 7,113,688, 7,640,803, 6,934,087, 6,850,675, 6,661,962, 6,738,177 and 6,516,109; and at US Published Patent Applications Nos. US 2010-030843 A1, US 2007-0052132 A1, US 2011-0317013 A1, US 2011-0255182 A1, US 2011-0274423 A1, and at U.S. patent application Ser. Nos. 13/442,721, 13/302,310, 13/247,938, 13/247,925, 13/247,919, 13/247,906, 13/247,902, 13/247,898, 13/247,895, 13/247,888, 13/247,869, 13/247,847, 13/079,681, 13/008,254, 12/946,680, 12/946,670, 12/946,657, 12/946,646, 12/946,624, 12/946,614, 12/946,557, 12/946,543, 12/946,526, 12/946,515, 12/946,495, 12/946,466, 12/946,430, 12/946,396, 12/873,962, 12/848,804, 12/646,722, 12/273,851, 12/273,785, 11/735,803, 11/734,700, 11/848,996, 11/491,742, and at USPTO-Patent Cooperation Treaty applications (PCTS) nos. PCT/US12/24018, PCT/US11/59446, PCT/US11/59437, PCT/US11/59435, PCT/US11/59427, PCT/US11/59420, PCT/US11/59415, PCT/US11/59414, PCT/US11/59403, PCT/US11/59387, PCT/US11/59385, PCT/US10/36749, PCT/US07/84343, and PCT/US07/84301.

All references cited above and below herein are incorporated by reference, as well as the background, abstract and brief description of the drawings, and U.S. application Ser. Nos. 12/213,472, 12/225,591, 12/289,339, 12/774,486, 13/026,936, 13/026,937, 13/036,938, 13/027,175, 13/027,203, 13/027,219, 13/051,233, 13/163,648, 13/264,251, and PCT application WO/2007/110097, and U.S. Pat. Nos. 6,873,358, and RE42,898 are each incorporated by reference into the detailed description of the embodiments as disclosing alternative embodiments.

The following are also incorporated by reference as disclosing alternative embodiments:

U.S. Pat. Nos. 8,055,029, 7,855,737, 7,995,804, 7,970,182, 7,916,897, 8,081,254, 7,620,218, 7,995,855, 7,551,800, 7,515,740, 7,460,695, 7,965,875, 7,403,643, 7,916,971, 7,773,118, 8,055,067, 7,844,076, 7,315,631, 7,792,335, 7,680,342, 7,692,696, 7,599,577, 7,606,417, 7,747,596, 7,506,057, 7,685,341, 7,694,048, 7,715,597, 7,565,030, 7,636,486, 7,639,888, 7,536,036, 7,738,015, 7,590,305, 7,352,394, 7,564,994, 7,315,658, 7,630,006, 7,440,593, and 7,317,815, and U.S. patent application Ser. Nos. 13/306,568, 13/282,458, 13/234,149, 13/234,146, 13/234,139, 13/220,612, 13/084,340, 13/078,971, 13/077,936, 13/077,891, 13/035,907, 13/028,203, 13/020,805, 12/959,320, 12/944,701 and 12/944,662, and United States published patent applications serial nos. US20120019614, US20120019613, US20120008002, US20110216156, US20110205381, US20120007942, US20110141227, US20110002506, US20110102553, US20100329582, US20110007174, US20100321537, US20110141226, US20100141787, US20110081052, US20100066822, US20100026831, US20090303343, US20090238419, US20100272363, US20090189998, US20090189997, US20090190803, US20090179999, US20090167893, US20090179998, US20080309769, US20080266419, US20080220750, US20080219517, US20090196466, US20090123063, US20080112599, US20090080713, US20090080797, US20090080796, US20080219581, US20090115915, US20080309770, US20070296833 and US20070269108.

What is claimed is:

1. An auto focus camera module, comprising:
a camera module housing defining an aperture and an internal cavity to accommodate camera module components;
an image sensor coupled to or within the housing;
a lens barrel within the housing that contains an optical train including at least one movable lens disposed relative to the aperture and image sensor to focus images of scenes onto the image sensor along an optical path; and
a fast focus MEMS actuator comprising at least one electrostatic comb drive and coupled to one or more lenses of the optical train including the at least one movable lens and configured to rapidly move said at least one movable lens relative to the image sensor to provide autofocus for the camera module in each frame of a preview or video sequence or both, wherein the fast focus MEMS actuator is configured to alternately auto focus on two or more regions of interest, such that each region of interest is refocused every respective two or more frames of the preview or video sequence or both.

2. The camera module of claim 1, wherein the fast focus MEMS actuator is configured to move the at least one moveable lens from a first position for a first one of the frames to a second position for a second, subsequent one of the frames to reliably refocus for the second subsequent frame within approximately 33 ms.

3. The camera module of claim 1, comprising a face tracking module that is configured to predict a location of a face region of interest in a future frame permitting the auto focus camera module to focus on the region of interest quickly.

4. The camera module of claim 1, comprising a face detection module that is configured to apply multiple short classifier chains in parallel to one or more windows of an image frame.

5. The camera module of claim 1, wherein the two or more regions of interest comprise two or more sub-regions of a face.

6. The camera module of claim 1, comprising a face recognition module that is configured to identify and prioritize one or more faces that correspond to one or more specific persons.

7. The camera module of claim 1, wherein the fast focus MEMS actuator is further configured to move the at least one movable lens relative to the image sensor to provide local focus on multiple regions of interest within a common image frame.

8. The camera module of claim 7, wherein the fast focus MEMS actuator is configured to cease lens motion during exposure of a first set of pixels in the common image frame, move the at least one movable lens between the exposure of the first set of pixels and exposure of a second set of pixels in the common image frame, and cease lens motion during the exposure of the second set of pixels.

9. The camera module of claim 1, wherein the optical train comprises:
first and second fixed lenses disposed on a first side of the at least one moveable lens;
third and fourth fixed lenses disposed on an opposing second side of the at least one moveable lens; and
wherein the fast focus MEMS actuator is formed from silicon or a substantially polymeric material and has a stroke of approximately 100 microns.

10. A method, comprising:
providing a camera module housing defining an aperture and an internal cavity to accommodate camera module components;
providing an image sensor coupled to or within the housing;
providing a lens barrel within the housing that contains an optical train including at least one movable lens disposed relative to the aperture and image sensor to focus images of scenes onto the image sensor along an optical path;
providing a fast focus MEMS actuator including at least one electrostatic comb drive coupled to one or more lenses of the optical train including the at least one movable lens and configured to move said at least one movable lens relative to the image sensor to provide autofocus for the camera module in each frame of a preview or a video sequence or both; and
operating the fast focus MEMS actuator to alternately auto focus on two or more regions of interest, such that each region of interest is refocused every respective two or more frames of the preview or video sequence or both.

11. The method of claim 10, further comprising moving, with the fast focus MEMS actuator, the at least one moveable lens from a first position for a first one of the frames to a second position for a second subsequent one of the frames to reliably refocus for the second subsequent frame within approximately 33 ms.

12. The method of claim 10, further comprising providing a face tracking module that is configured to predict a location of a face region of interest in a future frame permitting the auto focus camera module to focus on the region of interest quickly.

13. The method of claim 10, further comprising providing a face detection module that is configured to apply multiple short classifier chains in parallel to one or more windows of an image frame.

14. The method of claim 10, wherein the two or more regions of interest comprise two or more sub-regions of face.

15. The method of claim 10, further comprising providing a face recognition module that is configured to identify and prioritize one or more faces that correspond to one or more specific persons.

16. The method of claim 10, further comprising operating the fast focus MEMS actuator to move the at least one movable lens relative to the image sensor to provide local focus on multiple regions of interest within a common image frame.

17. The method of claim 16, wherein the operating comprises:
ceasing lens motion during exposure of a first set of pixels in the common image frame;
moving the at least one movable lens between the exposure of the first set of pixels and exposure of a second set of pixels in the common image frame; and ceasing lens motion during the exposure of the second set of pixels.

18. The method of claim 10, wherein the optical train comprises:
first and second fixed lenses disposed on a first side of the at least one moveable lens;
third and fourth fixed lenses disposed on an opposing second side of the at least one moveable lens; and
wherein the fast focus MEMS actuator is formed from silicon or a substantially polymeric material and has a stroke of approximately 100 microns.

* * * * *